United States Patent [19]

Matsushita et al.

[11] Patent Number: 4,752,696
[45] Date of Patent: Jun. 21, 1988

[54] METHOD OF INSPECTING FLOPPY DISK CASING

[75] Inventors: Toshihiro Matsushita; Yukio Kenmotsu, both of Kanagawa, Japan

[73] Assignee: Fuji Photo Film Co., Ltd., Kanagawa, Japan

[21] Appl. No.: 51,346

[22] Filed: May 19, 1987

[30] Foreign Application Priority Data

May 19, 1986 [JP] Japan .................. 61-114368

[51] Int. Cl.⁴ .................................. G11B 5/84
[52] U.S. Cl. ............................. 250/561; 250/571; 356/446
[58] Field of Search ........... 250/561, 548, 559, 562, 250/571, 572, 216, 221, 222.1, 574; 356/445–448

[56] References Cited

U.S. PATENT DOCUMENTS

| | | | |
|---|---|---|---|
| 3,746,869 | 7/1973 | Lindstedt et al. | 250/571 |
| 3,892,492 | 7/1975 | Eichenberger | 356/446 |
| 4,420,256 | 12/1983 | Fladda et al. | 250/574 |
| 4,540,887 | 9/1985 | Minerd et al. | 250/561 |
| 4,593,192 | 6/1986 | Slattery et al. | 250/561 |

Primary Examiner—David C. Nelms
Assistant Examiner—Charles Wieland
Attorney, Agent, or Firm—Sughrue, Mion, Zinn, Macpeak, & Seas

[57] ABSTRACT

In order to inspect a floppy disk casing for projection of a liner beyond an edge of the casing, a light beam is projected in the direction of the thickness of the casing so that at least a part of the light beam passes near the edge of the casing on the side of the edge opposite to the casing, and whether the liner projects beyond the edge is determined on the basis of the amount of light received by a light receiving means disposed in a direction in which, when a portion of the liner projects beyond the edge, the light beam is scattered by the projecting portion of the liner and which deviates from the direction of straight travel of the light beam.

2 Claims, 3 Drawing Sheets

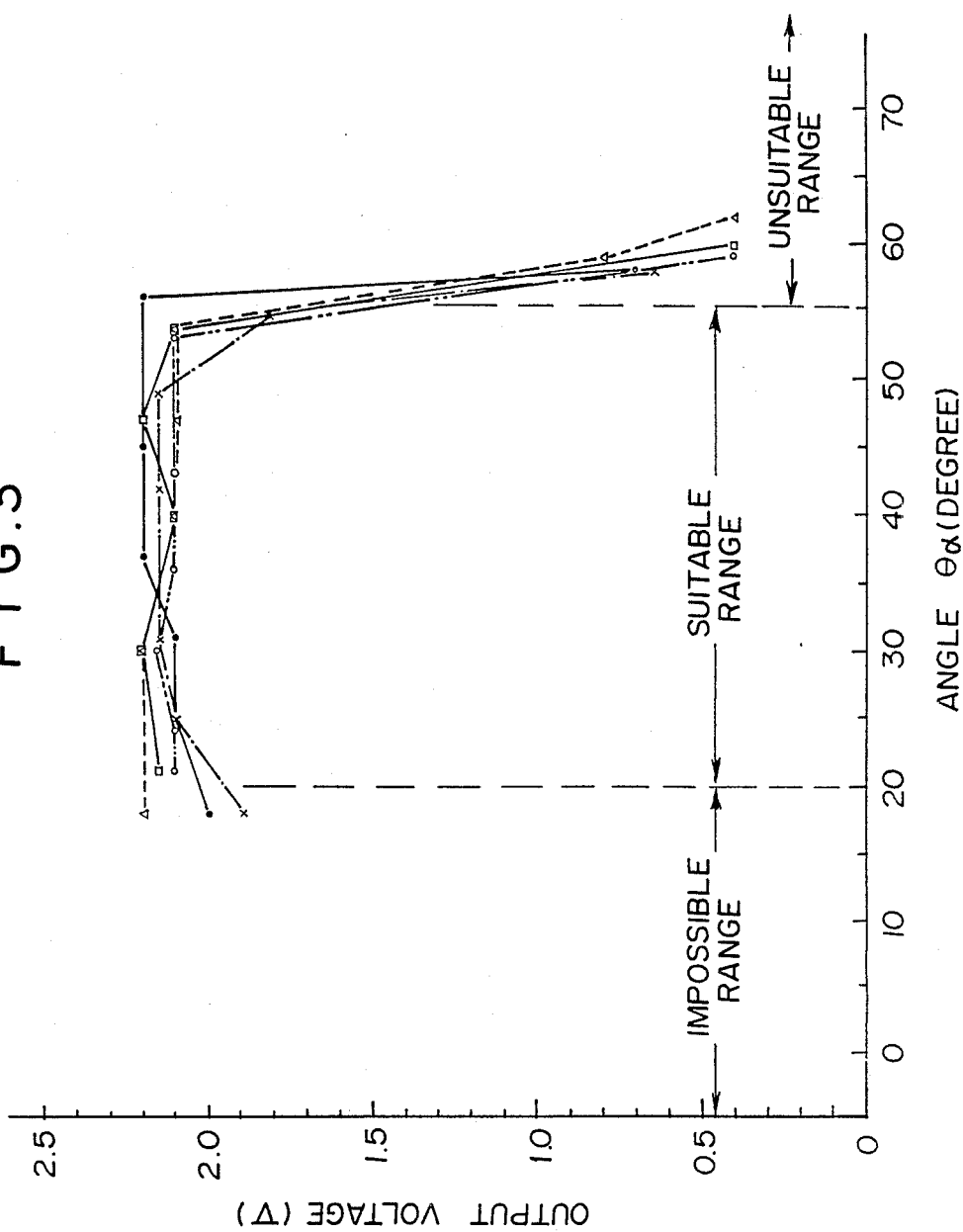

METHOD OF INSPECTING FLOPPY DISK CASING

BACKGROUND OF THE INVENTION

1. Field of the Invention

This invention relates to a method of inspecting a floppy disk casing which is for rotatably accommodating therein a magnetic recording disk and is provided with liners on the inner surfaces of the upper and lower walls thereof for cleaning the sides of the recording disk, and more particularly to a method of inspecting such a floppy disk casing for porjection of a part of the liners beyond an edge of the casing.

2. Description of the Prior Art

As is well known, a floppy disk or a micro floppy disk used as a recording medium for a computer, an electronic still camera and the like generally comprises a casing and a magnetic recording disk accommodated for rotation in the casing. The casing is generally referred to as a "jacket" or "shell", and is generally provided with liners formed of fiber material and bonded to the inner surfaces of the upper and lower walls thereof.

The casing is provided with a magnetic head receiving opening for giving the magnetic head access to the magnetic recording disk in the casing, and the liner is bonded to the casing to the edge of the magnetic head receiving opening to circumscribe the opening. When the liner is bonded to the casing in a wrong position, or when the liner fluffs up, the liner is apt to project into the magnetic head receiving opening to cause drop-out or to prevent recording and reproduction.

Accordingly, the floppy disk casing must be inspected for such projection of the liner in the manufacturing step of the floppy disk. Conventionally, a light beam is projected from one side of the casing to pass near the edge of the opening and the reflected part of the light beam is detected by a photodetector such as a TV camera and a linear image sensor, and whether the liner projects beyond the edge of the opening is determined on the basis of the amount of light received by the photodetector.

However, when the color of the casing resembles the color of the liner (generally white) and the reflectances of the casing and the liner approximate each other, it is difficult to distinguish light reflected by the liner from that reflected by the casing, and accordingly, in order to make a precise inspection, the light beam must be precisely positioned with respect to the casing to impinge solely upon the projecting portion of the liner, if any, and not to impinge upon the casing.

SUMMARY OF THE INVENTION

In view of the foregoing observations and description, the primary object of the present invention is to provide a method of inspecting the floppy disk casing for projection of the liner beyond an edge of the casing in which the inspection can be precisely effected without increasing the requirement for precision of the position of the inspection light beam.

In accordance with the present invention, a light beam is projected in the direction of the thickness of the casing so that at least a part of the light beam passes near the edge of the casing on the side of the edge opposite to the casing, and whether the liner projects beyond the edge is determined on the basis of the amount of light received by a light receiving means disposed in a direction in which, when a portion of the liner projects beyond the edge, the light beam is scattered by the projecting portion of the liner and which deviates from the direction of straight travel of the light beam.

In this specification, the term "floppy disk" should be broadly interpreted to include a so-called micro floppy disk, and the term "floppy disk casing" should be broadly interpreted to denote both a so-called jacket which is flexible and a so-called shell which is rigid. Further, the method of the present invention is generally applied to detection of whether the liner projects beyond the edge of the magnetic recording head receiving opening or the central opening but may also be applied to detection of whether the liner projects beyond the other edges of the casing.

Though generally made of white non-woven fabric, the liner may be of various other materials and colors.

Further, the term "a direction in which, when a portion of the liner projects beyond the edge, the light beam is scattered by the projecting portion of the liner and which deviates from the direction of straight travel of the light beam" denotes a direction inclined by a predetermined angle with respect to the direction of straight travel of the light beam at the edge. The predetermined angle depends on properties of the liner and may be 20° to 55°, for instance, in which scattered light distributes more than direct light.

Since, in the method of the present invention, the light receiving means is arranged to solely receive scattered light from the projecting portion of the liner in a direction deviated from the direction of straight travel of the light, the influence of reflected light from the casing need not be taken into account and accordingly the light beam need not be carefully positioned so that the light beam solely impinges upon the projecting portion of the liner. That is, when no part of the liner projects beyond the edge of the casing, a part of the light beam is interrupted by the casing and the other part of the light beam travels straight, and accordingly, less light impinges upon the light receiving means. On the other hand, when a part of the liner projects beyond the edge, the part of the light beams impinging upon the projecting portion of the liner is scattered to partly impinge upon the light receiving means while the part of the light beam impinging upon the casing is interrupted, whereby the amount of light received by the light receiving means is increased. On the basis of the amount of light received by the light receiving means, whether the liner projects beyond the edge is determined.

BRIEF DESCRIPTION OF THE DRAWINGS

FIG. 3 is a graph showing the intensity distribution of the scattered light from the liner of the casing.

DESCRIPTION OF THE PREFERRED EMBODIMENT

Figure 1:
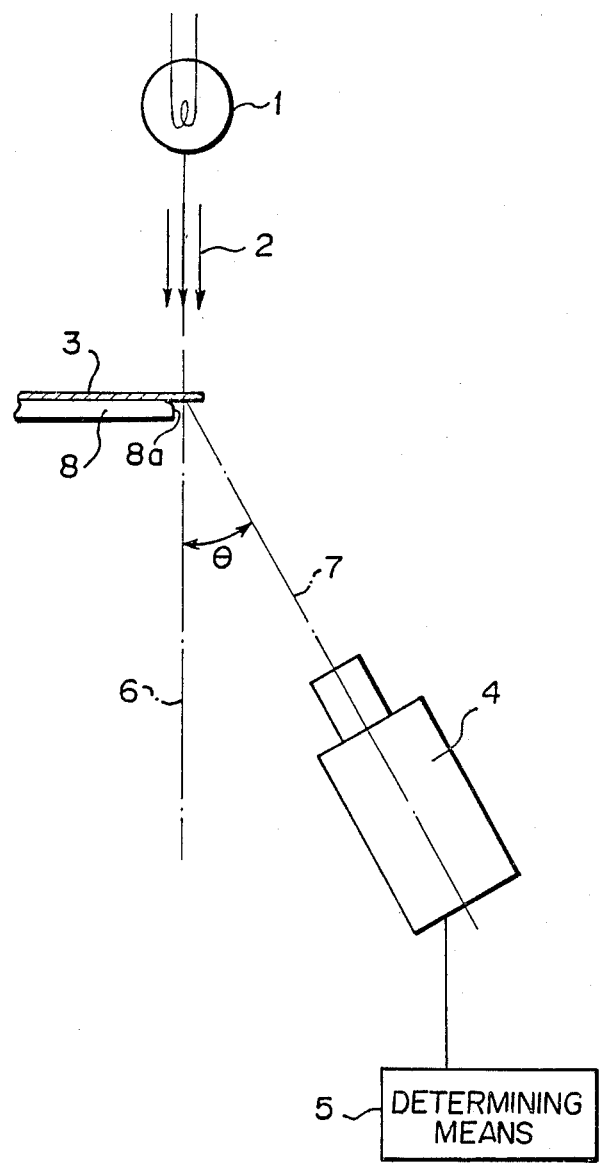
FIG. 1 is a schematic view showing a system for carrying out the method of the present invention.

In FIG. 1, a system for carrying out the method of the present invention comprises a light projector 1, a light receiver 4 which receives scattered light produced when a light beam 2 emitted from the light projector 1 impinges upon a liner 3 on a floppy fisk casing 8, and a determining means 5 which determines whether or not the liner 3 projects beyond an edge 8a of the casing 8 on the basis of the amount of light received by the light receiver 4. The light receiver 4 is disposed on a line 7 intersecting the optical axis 6 of the light beam 2 at a predetermined angle $\theta$ at the position in which a part of the liner 3 can project beyond the edge 8a of the casing 8. The light receiver 4 may be of a photo-electric converter such as an industrial TV camera, a linear image sensor or the like.

Figure 2:
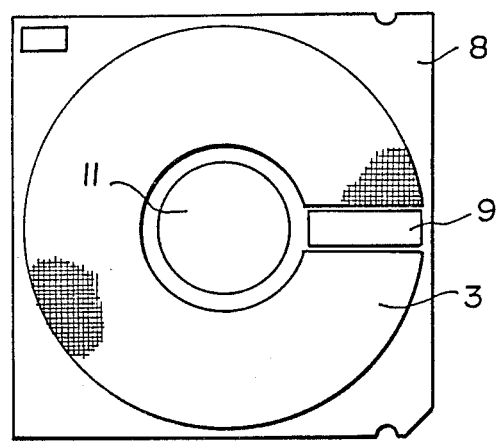
FIG. 2 is a schematic view showing an example of the floppy disk casing to be inspected by the system shown in FIG. 1.

The liner 3 is bonded to the inner surface of the floppy disk casing 8 for the purpose of removing dust on the magnetic recording disk. FIG. 2 shows the inside of a half of the floppy disk casing 8. The floppy disk casing half is provided with a magnetic head receiving opening 9 for giving the magnetic head access to the magnetic recording disk accommodated in the casing 8. The liner 3 is bonded to the floppy disk casing half to extend in opposition to the magnetic recording disk except at the portion of the opening 9. The casing 8 is formed of a light shielding plastic material and the liner 3 is formed of a non-woven fabric. Two examples of the non-woven fabric which can be used for forming the liner 3 are shown below.

EXAMPLE 1

Kendol 9303
material
  rayon 75%
  polypropylene 25%
thickness . . . 160µ–400µ
color . . . white

EXAMPLE 2

Kendol SP 188
material
  rayon 75%
  PET 25%
thickness . . . 160µ–400µ
color . . . white The liner 3 may be of various other materials such as rayon, PP, PET, nylon, PAN and the like. The thickness may be 100µ to 500µ.

Since the liner 3 is bonded to extend to the edge of the opening 9 in order to effectively remove dust on the disk, when the liner is bonded to the casing in a wrong position, or when the liner fluffs up due to unsatisfactory stamping of the liner, the liner 3 is apt to project beyond the edge 8a of the casing 8 into the magnetic head receiving opening 9 to cause drop-out or to prevent recording and reproduction. Further, when the liner 3 projects into the central opening 11, the floppy disk cannot be correctly inserted into the disk drive system or cannot be correctly taken out therefrom. Accordingly, floppy disk casings in which the liner 3 projects into the openings must be eliminated.

The light beam 2 is projected in the direction of the thickness of the casing 8 so that at least a part of the light beam passes near the edge 8a of the casing 8 on the side of the edge 8a opposite to the casing 8. When no part of the liner 3 projects beyond the edge 8a, a part of the light beam 2 is interrupted by the casing 8 and the other part of the light beam 2 travels straight. In this case, the light receiver 4 receives a small amount of light. On the other hand, when a part of the liner 3 projects beyond the edge 8a of the casing 8, a part of the light beam 2 is interrupted by the casing 8 while the other part of the same is scattered by the projecting portion of the liner 3 and a part of the scattered light impinges upon the light receiver 4, whereby the amount of light received by the light receiver 4 is increased. The amount of light received by the light receiver 4 is converted into an output voltage of the light receiver 4 which is input into the determining means 5, and the determining means determines whether the liner 3 projects beyond the edge 8a on the basis of the output voltage of the light receiver 4. The angle $\theta$ at which the line 7 intersects the optical axis 6 of the light beam 2 is selected taking into account various factors such as material, thickness and density of the liner 3. FIG. 3 is a graph showing the relation between the intensity of the scattered light (the output voltage of the light receiver 4) and the angle $\theta_\alpha$ at which the line 7 intersects the optical axis 6. The graph of FIG. 3 was obtained through experiments performed five times under the same conditions. As can be understood from FIG. 3, when the angle $\theta_\alpha$ is not larger than 20°, the light receiver 4 directly receives the light beam 2 as projected from the projector 1, and accordingly, it is impossible to solely measure the scattered light. On the other hand, when the angle $\theta_\alpha$ is not smaller than 55°, the intensity of the scattered light is too weak. Accordingly, when inspecting the floppy disk casing shown in FIG. 2 by the use of the system shown in FIG. 1, the predetermined angle $\theta$ should be between 20° and 55°.

Though in the description above, the floppy disk casing 8 is inspected in a disassembled state, it may be inspected in an assembled state.

We claim:

1. A method of inspecting a floppy disk casing for projection of a liner beyond an edge of the casing characterized in that a light beam is projected in the direction of the thickness of the casing so that at least a part of the light beam passes near the edge of the casing on the side of the edge opposite to the casing, and whether the liner projects beyond the edge is determined on the basis of the amount of light received by a light receiving means disposed in a direction in which, when a portion of the liner projects beyond the edge, the light beam is scattered by the projecting portion of the liner and which deviates from the direction of straight travel of the light beam.

2. A method as defined in claim 1 in which said light receiving means is disposed in the direction inclined with respect to the direction of straight travel of the light beam by an angle between 20° and 55°.

* * * * *